United States Patent
McConnell et al.

(10) Patent No.: US 9,016,129 B2
(45) Date of Patent: Apr. 28, 2015

(54) ACOUSTIC VECTOR SENSOR HAVING AN ACCELEROMETER WITH IN-BAND RESONANT FREQUENCY

(75) Inventors: James A. McConnell, Clinton, CT (US); Bruce M. Abraham, Old Lyme, CT (US); Scott C. Jensen, Gales Ferry, CT (US); Edward P. April, Mystic, CT (US); Jason P. Rudzinsky, Pawcatuck, CT (US)

(73) Assignee: Applied Physical Sciences Corp., Groton, CT (US)

( * ) Notice: Subject to any disclaimer, the term of this patent is extended or adjusted under 35 U.S.C. 154(b) by 1472 days.

(21) Appl. No.: 12/437,244

(22) Filed: May 7, 2009

(65) Prior Publication Data

US 2010/0281979 A1    Nov. 11, 2010

(51) Int. Cl.
*G01H 11/08* (2006.01)
*G01V 1/18* (2006.01)

(52) U.S. Cl.
CPC ...................................... *G01V 1/181* (2013.01)

(58) Field of Classification Search
None
See application file for complete search history.

(56) References Cited

U.S. PATENT DOCUMENTS

| | | | | |
|---|---|---|---|---|
| 5,392,258 | A * | 2/1995 | Gabrielson et al. | 367/149 |
| 6,370,084 | B1 * | 4/2002 | Cray | 367/141 |
| 7,066,026 | B2 * | 6/2006 | Deng | 73/514.34 |
| 7,104,140 | B2 * | 9/2006 | Zou et al. | 73/777 |

OTHER PUBLICATIONS

J.C. Shipps and K. Deng, "A Miniature Vector Sensor for Line Array Applications," IEEE Proc. OCEANS 2003, p. 3 (2003).

* cited by examiner

*Primary Examiner* — Harshad R Patel
(74) *Attorney, Agent, or Firm* — Ryan, Mason & Lewis, LLP

(57) ABSTRACT

Low cost miniature vector sensors are provided. An acoustic vector sensor is provided that comprises at least one accelerometer to measure at least one component of acoustic particle acceleration, wherein the at least one accelerometer has a resonant frequency within a measurement band of the acoustic vector sensor. In addition, a method is disclosed for measuring an acoustic signal. The method comprises the steps of configuring an array of acoustic vector sensors comprised of at least one accelerometer to measure at least one component of acoustic particle acceleration; operating the at least one accelerometer at a resonant frequency within a measurement band of the acoustic vector sensor; and generating a voltage using one or more of the acoustic vector sensors representative of the acoustic signal as the acoustic signal propagates past the array. The voltage optionally indicates a bearing of the acoustic signal.

11 Claims, 9 Drawing Sheets

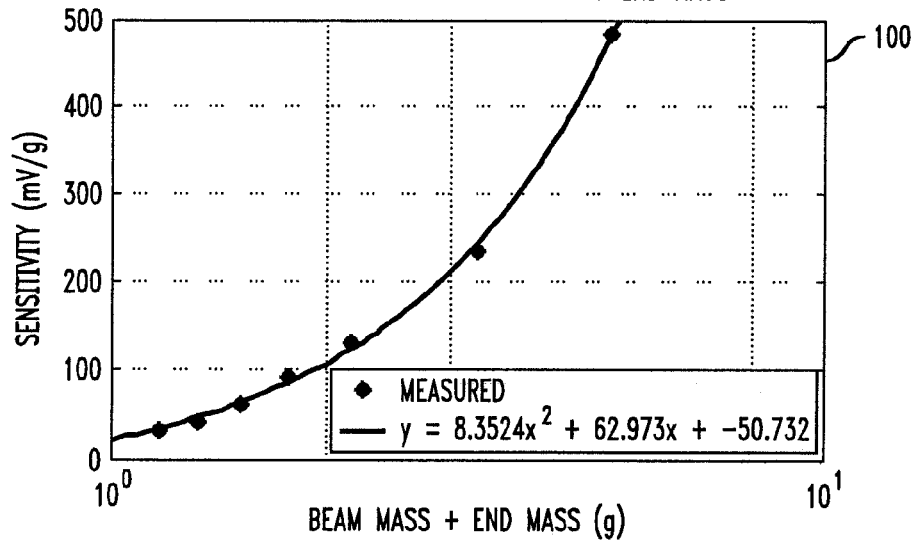
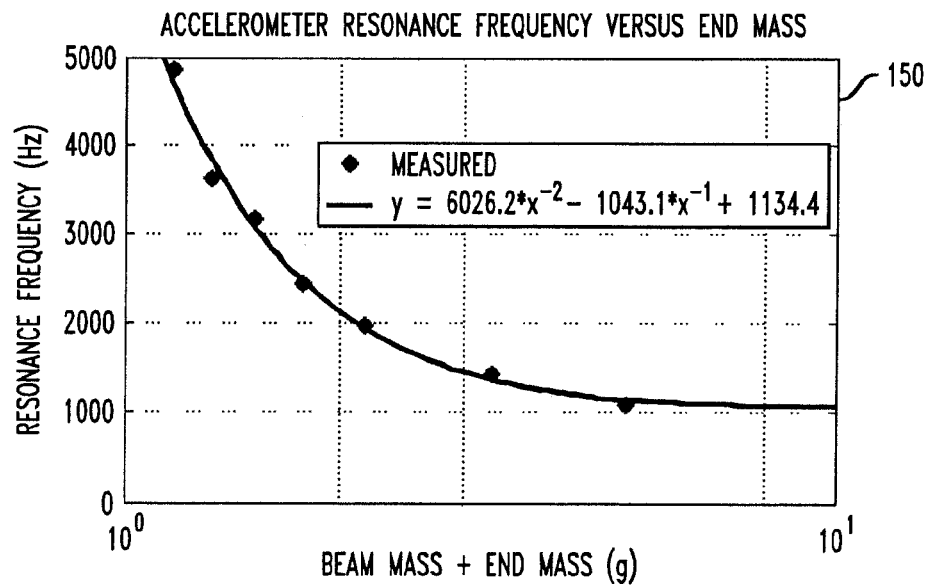

US 9,016,129 B2

ACOUSTIC VECTOR SENSOR HAVING AN ACCELEROMETER WITH IN-BAND RESONANT FREQUENCY

FIELD OF THE INVENTION

The present invention relates generally to underwater acoustic vector sensors, and more particularly, to miniature underwater acoustic vector sensors employing piezoelectric accelerometers having high sensitivity and low electromechanical cross-talk for use in miniature form factor applications.

BACKGROUND OF THE INVENTION

Vector sensors have been used in various underwater applications since the 1950's and typically contain individual transducers for measuring the acoustic pressure and the acoustic pressure-gradient at a single point in space. When the outputs of the transducers are combined in an additive format, cardioid beams are created and can be used to track sources of sound in water. Alternatively, when the outputs are combined in a multiplicative format, the acoustic intensity or acoustic impedance can be computed. In these ways, vector sensors have an inherent advantage over pressure sensors, particularly when used in direction finding applications and diagnostic measurement applications (e.g., acoustic intensity or impedance measurements).

The pressure transducer can take on many forms but usually consists of an air-backed hydrophone comprised of a piezoelectric disk or piezoelectric cylinder. The pressure-gradient transducer can also take on many forms but in many cases consists of a piezoelectric accelerometer contained within a rigid housing that also incorporates the pressure transducer. The use of an accelerometer to measure the pressure gradient is borne out of the linearized Euler equation that relates the pressure gradient to the particle acceleration in the acoustic medium (i.e., $\nabla p = -\rho_0 a$, where p is the acoustic pressure, $\rho_0$ is the ambient density of the medium, and $a$ is the acoustic particle acceleration) in the same way Newton's second law relates force and acceleration on a body (i.e., F=ma, where F is the force, m is the mass of the body, and a is the acceleration). As such, this type of vector sensor relies on the "inertial principle" and moves in phase with the acoustic wave provided its dimensions are small in comparison to an acoustic wavelength.

The so-called buoyancy factor dictates the relative amplitude between the kinetic component of the acoustic wave and that of the vector sensor such that a neutrally buoyant sensor moves with the same amplitude as the acoustic wave, a positively buoyant sensor moves with a larger amplitude, and a negatively buoyant sensor moves with a lower amplitude. In this context, the buoyancy factor serves as a means to adjust the intrinsic sensitivity of the accelerometer (i.e., the frequency dependent sensitivity in units of V/g or V/m/s² resulting from a calibration performed with a shaker and reference accelerometer) to the effective in-water acoustic sensitivity according to the relation $\beta = (M_0 + M_i)/(M_s + M_i)$, where $M_0$ is the displaced fluid mass based on the volume of the sensor, $M_s$ is the mass of the sensor, and $M_i$ is the induced fluid mass associated with the sensor translating in the acoustic medium during passage of a sound wave.

For a further discussion of the operating principles of inertial-type vector sensors, see, for example, J. A. McConnell, "Analysis of a Compliantly Suspended Acoustic Velocity Sensor," J. Acoust. Soc. Am. 113(3), 1395-1405 (2003), or J. A. McConnell, "Development and Application of Inertial-Type Underwater Acoustic Intensity Probes," Ph.D. Thesis, Ch. 2, 6, and 7, Pennsylvania State University, University Park, Pa. (2004), each incorporated by reference herein.

SUMMARY OF THE INVENTION

Generally, low cost miniature vector sensors are provided. According to one aspect of the invention, an acoustic vector sensor is provided that comprises at least one accelerometer to measure at least one component of acoustic particle acceleration, wherein the at least one accelerometer has a resonant frequency within a measurement band of the acoustic vector sensor. The acoustic vector sensor optionally further comprises piezoelectric plates comprised of a ceramic material or a single crystal material or a piezoelectric transducer to measure the acoustic pressure (or both).

In one embodiment, the at least one accelerometer is a tri-laminar structure comprising a metal beam flanked by two thickness poled piezoelectric plates. The tri-laminar structure is coated in a viscoelastic material along its length and bonded to a rigid base with one or more of a viscoelastic material and a polymer in order to tune the resonant frequency and mechanical quality factor to a desired value.

In another embodiment, the at least one accelerometer comprises a bi-laminar structure comprising of a metal beam flanked by one thickness poled piezoelectric plate. The bi-laminar structure is coated in a viscoelastic material along its length and bonded to a rigid base with one or more of a viscoelastic material and a polymer in order to tune the resonant frequency and mechanical quality factor to a desired value.

According to another aspect of the invention, a method is disclosed for measuring an acoustic signal. The method comprises the steps of configuring an array of acoustic vector sensors comprised of at least one accelerometer to measure at least one component of acoustic particle acceleration; operating the at least one accelerometer at a resonant frequency within a measurement band of the acoustic vector sensor; and generating a voltage using one or more of the acoustic vector sensors representative of the acoustic signal as the acoustic signal propagates past the array. The voltages from the sensor can then be used to obtain the bearing of the acoustic signal. Each acoustic vector sensor can be positioned in the array such that a principal axis of sensitivity of the accelerometers is perpendicular to the array axis.

A more complete understanding of the present invention, as well as further features and advantages of the present invention, will be obtained by reference to the following detailed description and drawings.

BRIEF DESCRIPTION OF THE DRAWINGS

FIG. 1 illustrates the accelerometer sensitivity and resonance frequency as a function of end mass for the accelerometer of FIG. 2;

DETAILED DESCRIPTION

Figure 2:
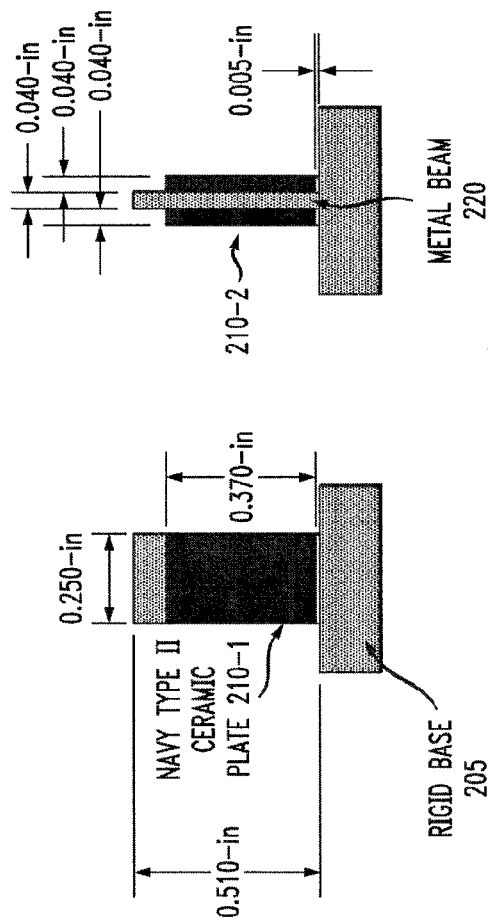
FIG. 2 illustrates a conventional accelerometer containing ceramic transduction elements and an in-band resonance.

Aspects of the present invention provide an acoustic vector sensor that comprises at least one accelerometer to measure at least one component of acoustic particle acceleration. The at least one accelerometer has a resonant frequency within a measurement band of the acoustic vector sensor.

Transducer Performance with In-Band and Out-Of-Band Resonances

One of the most important attributes of any underwater acoustic sensor is to exhibit an electronic noise floor that is well below the lowest acoustic signal of interest. This is usually accommodated with a marriage of an optimal sensor design with an optimal preamplifier design given other design constraints. Experience dictates that this approach is very straightforward for piezoelectric sensors that measure the acoustic pressure, but very difficult for piezoelectric sensors that measure the acoustic pressure-gradient, particularly at frequencies below 1 kHz. This latter issue is exacerbated when the sensing platform mandates small geometrical form factors for its internal components.

Moreover, the usual design practice for miniature vector sensors is to employ transducers having a fundamental resonance well above the frequency range of interest and to use high performance single crystal-based piezoelectric accelerometers, See, K. K. Deng, "Underwater Acoustic Vector Sensor Using Transverse-Response Free, Shear Mode PMN-PT Crystal," U.S. Pat. No. 7,066,026 B2, dated Jun. 27, 2006, and L. Zou and K. K. Deng, "High Sensitivity Low Noise Piezoelectric Flexural Sensing Structure Using <011> Poled Relaxor-Based Piezoelectric Single Crystals," U.S. Pat. No. 7,104,140 B2, dated Sep. 12, 2006, each incorporated by reference herein.

While this approach may be novel, it translates into high costs because the single crystal material is very expensive, relative to conventional ceramic transduction materials, and does not lend itself nicely to standardized assembly techniques. By way of example, in the not too distant past, a lot of size thirty (30) shear mode PMN-PT single crystal plates having dimensions of 5 mm (L)×5 mm (W)×1 mm (H), a <111> crystallographic orientation, and a xzt-22.5 cut can cost approximately $10,000.00, whereas the same number of Navy Type II ceramic plates can cost below approximately $1,000.00. The cost differential can be approximately a factor of 10. Additionally, the accepted practice of soldering electrical leads to piezoelectric transduction elements can not be used for single crystal material because the temperature of most solders exceeds the Curie temperature (i.e, the temperature that will substantially degrade or completely depolarize a piezoelectric material). To illustrate this point further, the Curie temperature for PMN-PT single crystal is $T_c \sim 170°$ C., whereas for Navy Type II ceramic $T_c \sim 370°$ C. See, e.g., C. H. Sherman and J. L. Butler, "Transducers and Arrays for Underwater Sound," 552-553 (Springer, New York, 2007).

Most solders need to be heated to over 250° C. to work properly. For the case of single crystal transducers, special low temperature solder, conductive epoxy, or novel electroding techniques are required to resolve this issue. These steps increase fabrication costs and reduce reliability for miniature vector sensors.

As an alternative to using high performance accelerometers containing single crystal transduction elements and an out-of-band resonance, accelerometers containing conventional ceramic transduction elements and an in-band resonance are well suited for vector sensors that require miniature form factors and low electronic noise floors. The use of an in-band resonance provides greater sensitivity relative to the case of a similar unit with an out-of-band resonance. This is borne out of the converse problem of designing sound projectors having an in-band resonance to deliver greater sound levels than projectors without an in-band resonance. Moreover, when this concept is used in conjunction with conventional ceramic, the electronic noise floor of the accelerometer will rival that of a single crystal-based unit, but at a lower cost.

To illustrate this concept, FIG. 1 presents the results of measuring the sensitivity 100 and resonance frequency 150 of a cantilever beam piezoelectric accelerometer as a function of the end mass. FIG. 1 shows that the sensitivity 100 below the fundamental resonance frequency is proportional to the end-mass and the resonance frequency 150 is inversely proportional to the end-mass. As such, the end-mass can be used to tune the sensitivity 100 and resonance frequency 150 for a particular frequency band so that the desired electronic noise floor can be achieved. Though not shown in the figure, the sensitivity has a maximum at the resonance frequency.

The accelerometer 200 used in the evaluation of FIG. 1 is shown in FIG. 2, which presents a schematic showing two elevational views. FIG. 2 includes a first elevation view 250 where the width of a beam 220 is in the plane of the page and a second elevation view 260 where the thickness of the beam 220 is in the plane of the page.

In FIG. 2, the accelerometer 200 contains two series-connected thickness-poled Navy Type II ceramic plates 210-1 and 210-2 that are bonded to an aluminum beam 220 that is fixed at one end to a rigid base 205 and contains a discrete mass (not shown) at the other end. The value for the end-mass was varied by fabricating identical units from materials having significantly different densities. In one of the test cases, no end-mass was used. The sensitivity 100 was measured using the comparison technique involving a moving coil shaker and reference accelerometer. The resonance frequency 150 was inferred from an electrical admittance measurement. For a more detailed discussion of these results, see, e.g., J. A. McConnell and S. C. Jensen, "Development of a Miniature Uniaxial Pressure-Acceleration Probe for Bio-acoustic Applications (A), J. Acoust. Soc. Am., 119, 3446 (2006), incorporated by reference herein.

One disadvantage of using the discrete end-mass approach delineated above concerns the result of creating a resonant system that exhibits an unreasonably high mechanical quality factor, or Q, owing itself to the low mechanical losses in the system. The accelerometers 200 shown in FIG. 2 all had high-Q resonances with quality factors reaching as high as approximately 200. This is an undesirable attribute because it leads to ringing and electromechanical cross-talk which can limit the dynamic range of the measurement system and degrade the sensor's directivity pattern. It is the object of the present invention to circumvent these issues.

It is noted that the in-band resonance technique is not required for the pressure sensor, since existing designs, which consider conventional ceramic transducers having an out-of-band resonance, already meet electronic noise floor specifications for most measurement scenarios.

The accelerometers 200 shown in FIG. 2 can be fabricated with various end-masses, including Tungsten, Bronze, Titanium and Aluminum, as would be apparent to a person of ordinary skill in the art.

Acoustic Vector Sensor

As previously indicated, an aspect of the present invention provides an acoustic vector sensor that comprises at least one accelerometer to measure at least one component of acoustic particle acceleration. The at least one accelerometer has a resonant frequency within a measurement band of the acoustic vector sensor.

Figure 3:
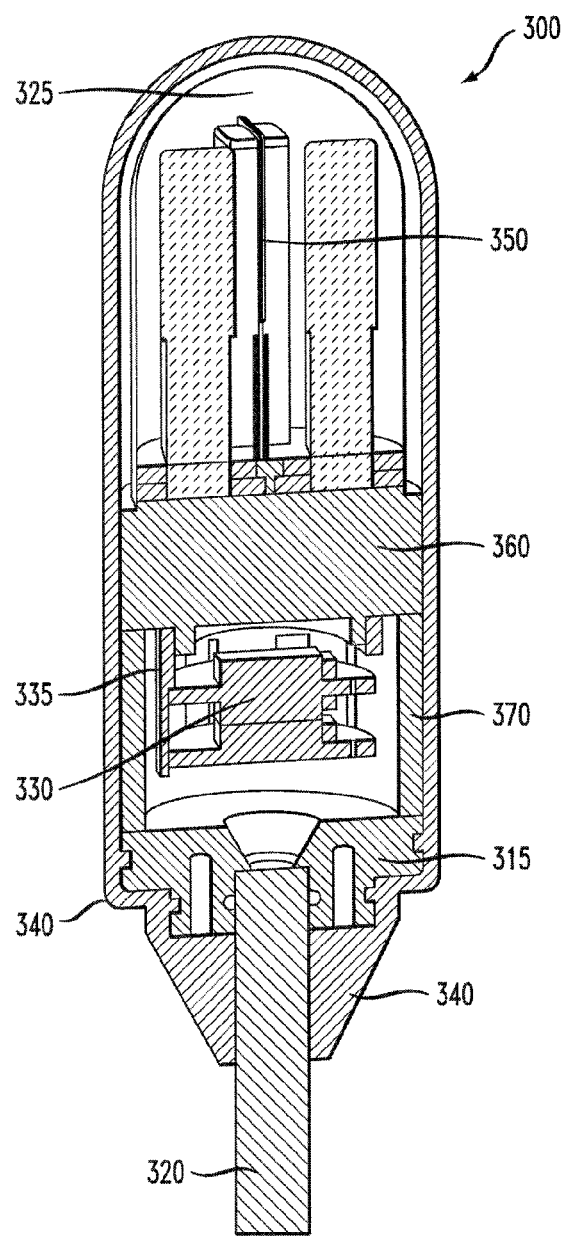
FIG. 3 illustrates a cut-away schematic of an embodiment of an accelerometer in accordance with the present invention.

FIG. 3 presents a cut-away schematic of an embodiment of acoustic vector sensor 300 incorporating features of the present invention. As shown in FIG. 3, the acoustic vector sensor 300 is a cylindrical body that contains an air-backed piezoelectric ceramic cylinder to measure the acoustic pressure and a biaxial accelerometer to measure two orthogonal components of the acoustic particle acceleration. The acoustic vector sensor 300 includes accelerometers 350 that are oriented such that their principle axes of sensitivity are orthogonal to the axis of the cylindrical body. In this way, when the vector sensor 300 is installed inside a line array, it can resolve the so-called left-right ambiguity that is problematic of existing arrays that employ pressure sensors. Other features shown in FIG. 3 include the means to incorporate a stack of printed circuit boards 330 that contain transducer preamplifiers and related electronics.

The pressure sensor 370 is capped at both ends with caps 315 and 360 to form a pressure vessel that can withstand typical operational pressures. The pressure sensor 370 consists of an air-backed ceramic cylinder having caps 315 and 360 at both ends. The caps 315 and 360 also serve as the means to ensure that the acoustic pressure acts on the external surface of the ceramic cylinder. In this embodiment, the open-circuit voltage sensitivity can be predicted with the formulae contained in R. A. Langevin, "The Electro-Acoustic Sensitivity of Cylindrical Ceramic Tubes," J. Acoust. Soc. Am., 26, 421-427 (1953). The in-water resonance frequency can be predicted using the approach taken in J. A. McConnell (2004), incorporated by reference herein. In the present invention, the resonance frequency of the pressure sensor is designed to be well above the frequency range of interest.

The cap 315 serves as the means to route the electrical signals from the circuit board to the measurement hardware via a multi-conductor shielded cable 320 and as an anchoring point for one end of the pressure sensor. The cap 360 provides a rigid termination for the accelerometers, which conform to the design of a tri-laminar piezoelectric cantilever beam containing a viscoelastic coating. As shown in FIG. 3, the cantilever beam accelerometers 350 (only one of four is shown in FIG. 3) contain conventional ceramic elements and an in-band mode.

Here, the coating serves as a distributed mass and damper to facilitate an in-band mode having a low mechanical quality factor. The cavity where the accelerometers 350 are housed is sealed by a cylindrical tube 325 having a tapered end-cap. The dimensions of the tube 325 are sized so that it can withstand deep submergence. A by product of this attribute is that the tube's fundamental resonance frequency is well above the frequency range of interest.

As shown in FIG. 3, the acoustic vector sensor 300 includes a slotted plastic cylindrical shell 335 that serves as a means to hold the printed circuit boards 330. In one embodiment, the acoustic vector sensor 300 may include polyurethane potting 340 to seal the sensor and provide a good impedance match to the acoustic medium. In addition, the polyurethane potting 340 can provide strain relief for the signal cable where it exits the sensor body. FIG. 3 also illustrates the top of cap 360 serving as a rigid base of the acoustic vector sensor 300 that serves as an anchoring point for the accelerometers and one end of the pressure sensor.

The piezoelectric plates may be implemented using, for example, PZT (Lead Zirconate Titanate), PMN-PT (Lead Magnesium Niobate-Lead Titanate) or PZN-PT (Lead Zirconium Niobate-Lead Titanate).

Miniature Vector Sensor

Figure 4:
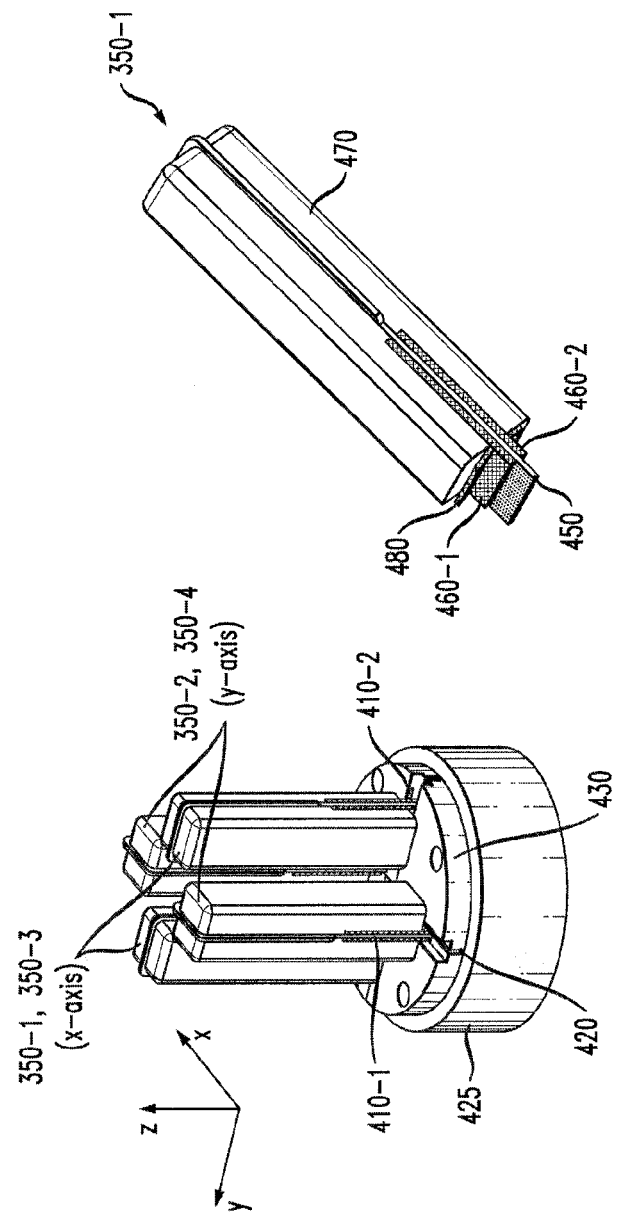
FIG. 4 illustrates the assembly details of the accelerometers of FIG. 3.

FIG. 4 shows the assembly details of the accelerometers 350 of FIG. 3. As shown in FIG. 4, each accelerometer 350-1 through 350-4 contains two tri-laminar piezoelectric cantilever beams, such as beams 410-1 and 410-2, that are anchored in a slot 420 machined in the face of the base 425. The cantilever beams are electrically connected in series or parallel to produce the desired sensitivity and electronic noise floor. This symmetrical arrangement also makes the sensor insensitive to rotational motion about the z-axis and consequently polarizes the response of the accelerometers to rectilinear motion, which is their intended purpose. Rotational motion about the x- and y-axis can be counteracted by a locating orthogonal pairs of accelerometers on the backside of the base and would constitute a different embodiment to the design shown FIGS. 3 and 4. The aforementioned slot is filled with a high strength epoxy to fasten the cantilever beams to the base. The epoxy also serves as a means to damp the resonance associated with the accelerometer. The base is preferably made from a high strength ceramic material such as alumina, beryllia, or macor so that it is sufficiently stiff and electrically inert in order to mechanically and electrically isolate one set of cantilever beams from the other set. This feature is critical to preserving the dipole null depth associated with the accelerometer's directivity pattern. The base 425 also contains a network of holes, such as hole 430 (only one of four is labeled in FIG. 4) that provide the means to route electrical leads 480 from the accelerometers 350 to the preamplifier.

FIG. 4 also contains a detailed drawing of one exemplary accelerometer 350-1 and shows that it contains a tri-laminar structure consisting of a metal beam 450-flanked by two thickness-poled piezoelectric ceramic plates 460-1 and 460-2. The ceramic plates 460-1 and 460-2 do not span the entire length of the beam and are located near the portion of the beam 450 that is anchored to the base 425. This design methodology is chosen because the strain energy associated with a cantilever beam undergoing transverse bending has a maxima at the fixed end and a minima at the free end. Moreover, it follows from this rationale that the stress imparted to the ceramic plates 460-1 and 460-2 will be greatest when the plates 460-1 and 460-2 are located near the fixed end and will therefore facilitate high sensitivity.

As stated previously, the cantilever beam contains a viscoelastic coating 470 that serves as a distributed mass and damper to facilitate an in-band mode having a low mechanical quality factor. This feature resolves the issue cited earlier with regard to using a discrete mass at the end of the beam 450 to increase the sensitivity of the accelerometer 350. This concept would also work for single crystal-based accelerometers, if so desired. Nevertheless, appropriate selection of the cantilever beam's dimensions and material properties along with the corresponding dimensions and material properties of the viscoelastic material facilitate the development of a high sensitivity/low noise accelerometer that is well suited for a miniature vector sensor having operational bandwidths below 1 kHz.

Accelerometer Modeling and Assessment of Sensitivity

The functional relationship between the electromechanical properties of accelerometers that employ the transverse bending mode of a piezoelectric material can be modeled with lumped parameters to determine their sensitivity, as explained in J. A. McConnell (2004). In that regard, the formula that predicts the intrinsic open-circuit voltage sensitivity is defined as:

$$\frac{e}{a} = k^2 \cdot \frac{M_m}{N} \cdot \left[1 + \frac{j}{Q}\frac{\omega}{\omega_0} - \frac{\omega^2}{\omega_0^2}\right]^{-1}, \quad (1)$$

where $k^2 = C_m N^2/(C_m N^2 + C_{eb})$ is the electromechanical coupling factor, $M_m$ is the mechanical mass associated with the composite beam, N is the electro-mechanical turns ratio, $\omega$ is the radian frequency, $\omega_0 = (M_m C_{eqv})^{-1/2}$ and $Q = M_m \omega_0/R_m$ are the resonance frequency and quality factor, $j = \sqrt{-1}$, $C_m$ is the mechanical compliance of the composite beam, $C_{eb}$ is the blocked electrical capacitance of the piezoelectric plates, $R_m$ is the mechanical resistance of the composite beam, and $C_{eqv} = C_m C_{eb}/(C_m N^2 + C_{eb})$ is the effective mechanical compliance of the composite beam. The in-water acoustic sensitivity of the accelerometer is simply the product of Eq. (1) and the buoyancy factor $\beta$ defined earlier. Moreover, Eq. (1) shows the relationship between the sensitivity, resonance frequency, and quality factor as a function of the mass $M_m$ and damping $R_m$ in the system. These parameters are critical in determining the performance of this class of accelerometer.

Figure 5:
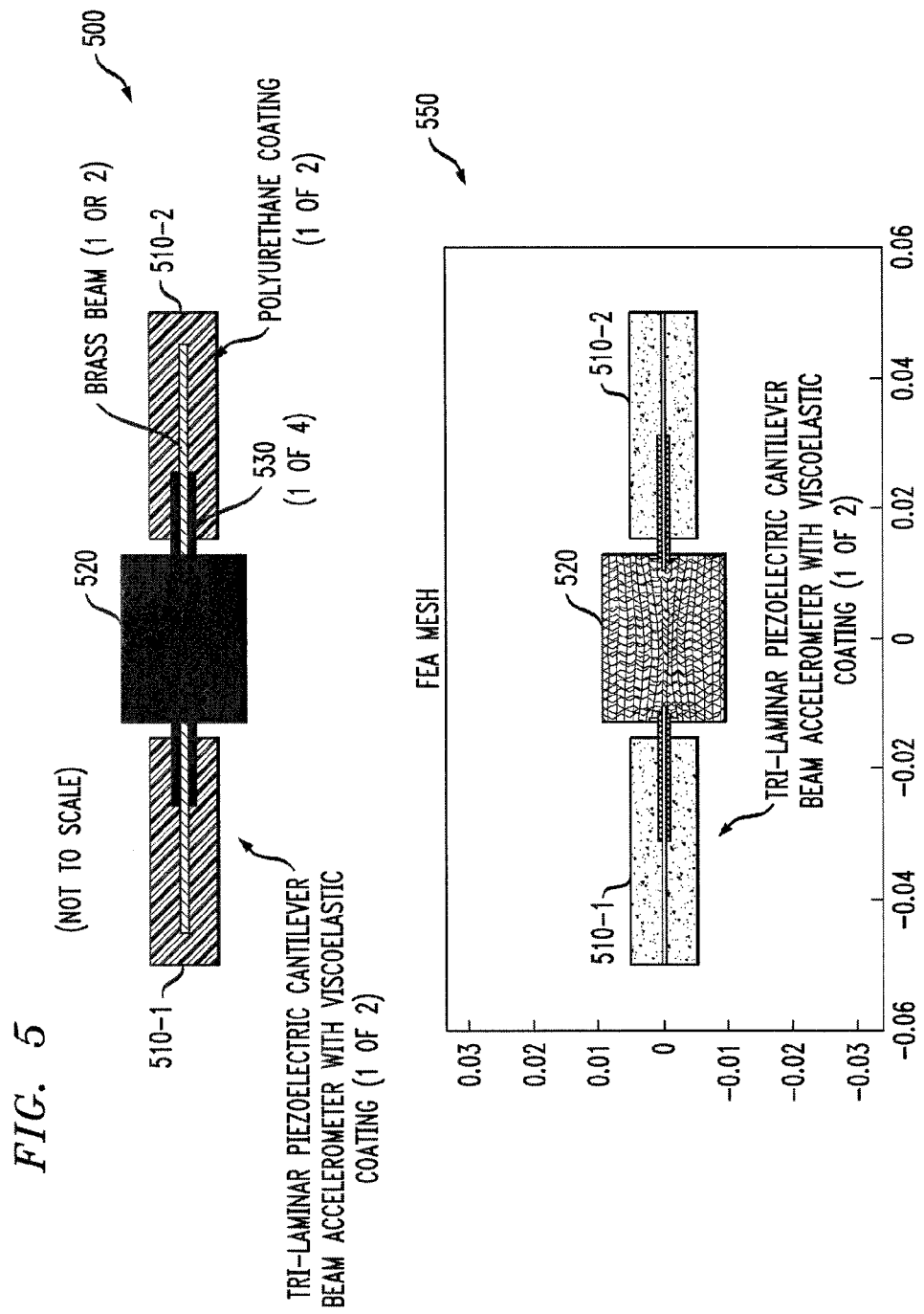
FIG. 5 illustrates a mechanical drawing and a finite element model for an accelerometer.
Figure 6:
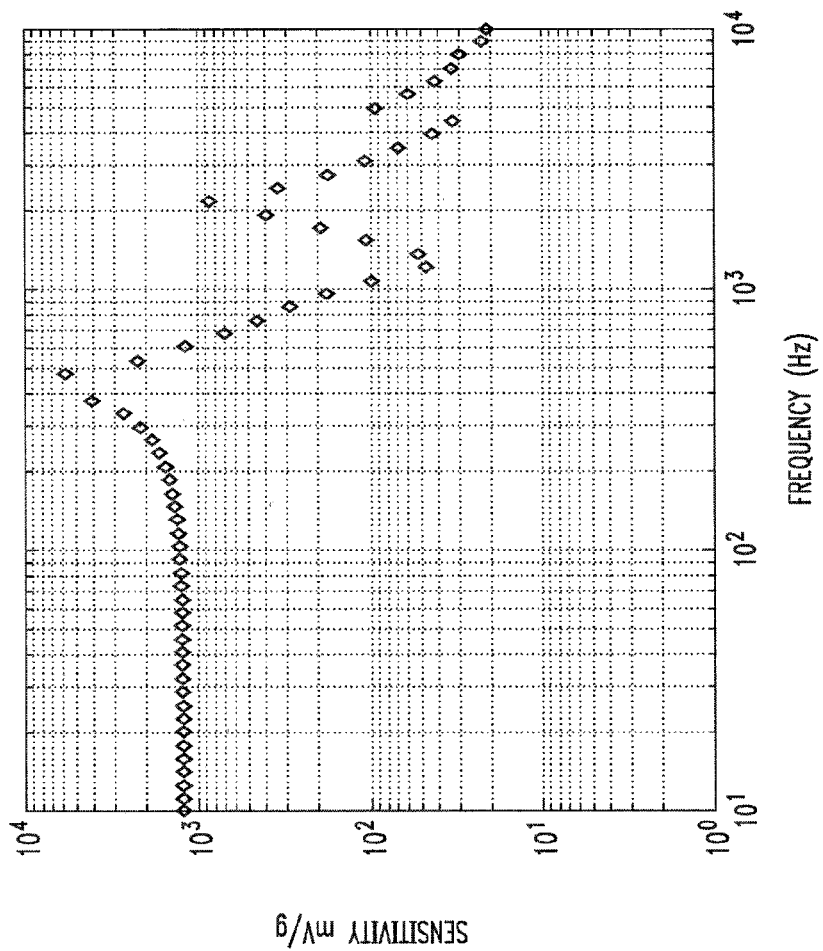
FIG. 6 illustrates the accelerometer sensitivity and resonance frequency for the accelerometer shown in FIG. 5.

Finite element modeling can also be used to determine the sensitivity and is also helpful to ascertain the dynamic response of the entire sensor. An example of this is shown in FIGS. 5 and 6, which present the results of modeling a slightly different embodiment of the accelerometer shown in FIGS. 3 and 4. FIG. 5 presents a mechanical drawing 500 and a finite element model 550 which show that the accelerometer consists of two cantilever beams 510-1 and 510-2 that are located on opposite sides of a macor base 520. Each beam contains 510-1 and 510-2 two thickness-poled Navy Type II ceramic plates 530 that are electrically connected in series. Additionally, the first set of plates are electrically connected in series with the second set of plates and each plate has dimensions in an exemplary embodiment of 12.7 mm (L)×6.35 mm (W)× 0.51 mm (H). The metal beam element is made of brass and has dimensions of 38.1 mm (L)×6.35 mm (W)×0.51 mm (H). The viscoelastic coating is made of polyurethane having a density, modulus of elasticity, and damping loss factor of 1.1 g/cm³, 103 MPa, and 20%, respectively. The coating has the same overall length as the beam and has seven times the overall thickness of the beam in an exemplary embodiment. The coating is spaced away from the macor base 520 by a nominal distance equal to roughly one-beam thickness. FIG. 6 shows that the resulting sensitivity of the accelerometer is 1200 mV/g and has a fundamental resonance and quality factor of ~450 Hz and <10, respectively. Experience with vector sensors developed for low frequency applications indicates that the sensitivity of nominally 1 V/g (as is shown in FIG. 6) will be ample to meet the so-called Sea State Zero noise specification, see, R. J. Urick, "Principles of Underwater Sound," (Peninsula Publishing, Los Altos, Calif., 1983), 3$^{rd}$ Ed., p. 210.

Figure 7:
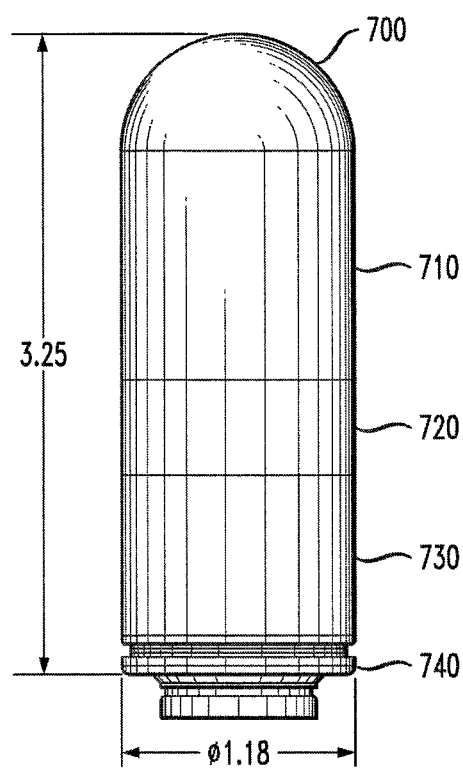
FIG. 7 is a mechanical drawing of a prototype sensor incorporating features of the present invention.

FIG. 7 presents a mechanical drawing of a prototype sensor 700. The prototype 700 comprises a housing 710, base 720, pressure hydrophone 730 and hydrophone end cap 740. As shown in FIG. 7, the sensor 700 is similar to that shown in FIG. 3. The overall length (excluding the cable) and diameter of the prototype is less than 90 mm (3.5 in) and 38 mm (1.5 in), respectively and is suitable for miniature form factor applications.

Figure 8:
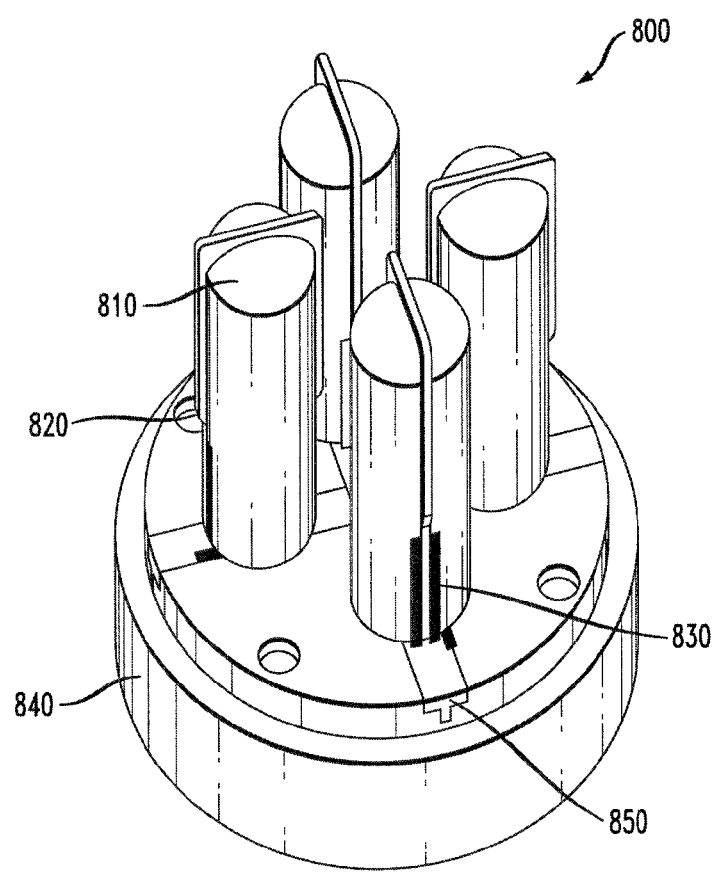
FIG. 8 illustrates the assembly and arrangement of an accelerometer in accordance with an embodiment of the present invention on a base.

FIG. 8 illustrates how the accelerometer 800 associated with the sensor shown in FIG. 7 is assembled and arranged on a base. The accelerometer 800 comprises a polyurethane coating 810, brass beam 820, PZT element 830, Macor base 840 and epoxy joints 850. It is clearly shown in FIG. 8 that the accelerometer design is similar to that shown in FIG. 4 with one notable, but minor difference. That is, the viscoelastic coating in FIG. 4 has a rectangular cross-section, whereas the coating in FIG. 8 has a cylindrical cross-section. The cylindrical coating was done for simplicity of manufacture, but translates into lower mass-per-unit-length. Moreover, the design of the tri-laminar beam and associated electrical connections shown in FIG. 8 are virtually identical to those discussed earlier with regard to the finite element model shown in FIG. 5.

Figure 9:
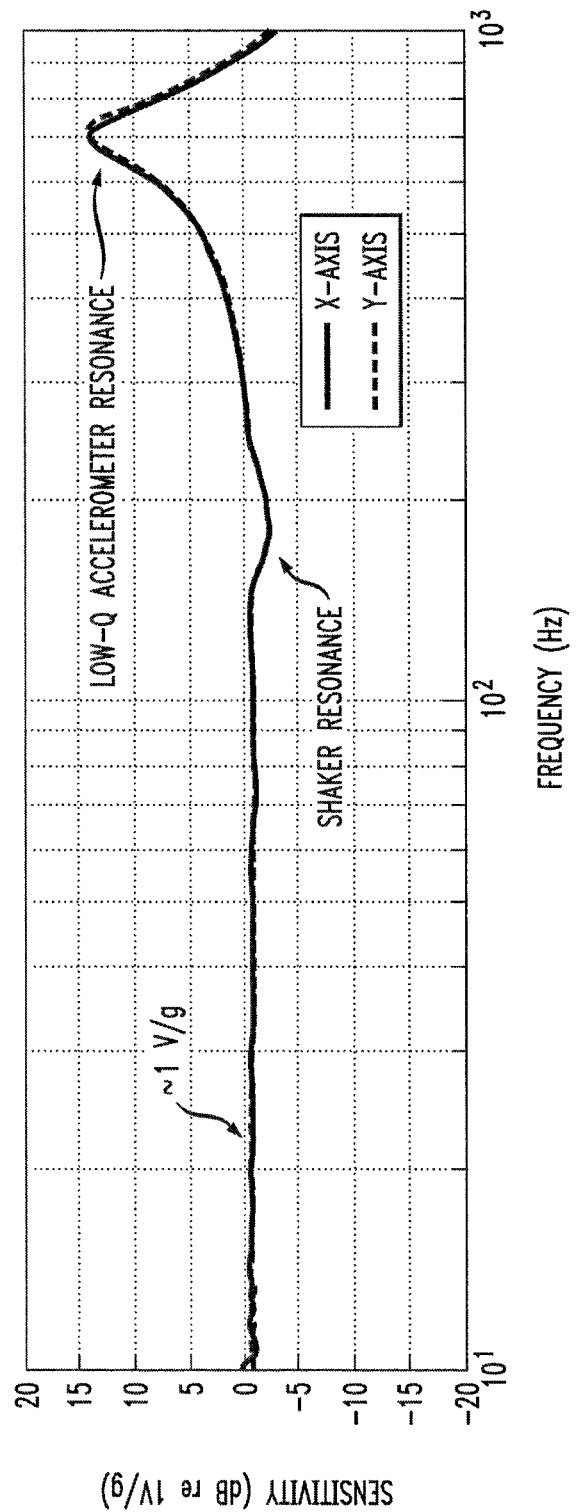
FIG. 9 presents the result of measuring the intrinsic voltage sensitivity of the prototype accelerometer of FIG. 8 over a frequency range from 10 Hz to 1 kHz.

FIG. 9 presents the result of measuring the intrinsic voltage sensitivity of the prototype accelerometer over the frequency range from 10 Hz to 1 kHz. The data was obtained using the comparison technique involving an electro-dynamic shaker and reference accelerometer. The data indicates that both the x- and y-axis accelerometers exhibit a sensitivity below resonance that is nearly 1 V/g and have a low-Q resonance occurring at approximately 700 Hz. The differences between the measured results and the finite element model are simply due to the lower mass associated with the viscoelastic coating having a cylindrical cross-section. Note that the dip in the measured data at approximately 180 Hz is due to a structural resonance associated with attachment of the accelerometer to the shaker and is not indicative of anomalous performance.

CONCLUSION

It is to be understood that the embodiments and variations shown and described herein are merely illustrative of the principles of this invention and that various modifications may be implemented by those skilled in the art without departing from the scope and spirit of the invention.

We claim:

1. An acoustic vector sensor, comprising:
   at least one accelerometer to measure at least one component of acoustic particle acceleration, wherein said at least one accelerometer has a resonant frequency within a measurement band of said acoustic vector sensor.

2. The acoustic vector sensor of claim 1, wherein said at least one accelerometer is a tri-laminar structure comprising a metal beam flanked by two thickness-poled piezoelectric plates.

3. The acoustic vector sensor of claim 2, wherein said tri-laminar structure is coated in a viscoelastic material along its length and bonded to a rigid base with one of a viscoelastic material and a polymer in order to tune said resonant frequency and mechanical quality factor to a desired value.

4. The acoustic vector sensor of claim 1, wherein said at least one accelerometer comprises a bi-laminar structure comprising of a metal beam flanked by one thickness poled piezoelectric plate.

5. The acoustic vector sensor of claim 4, wherein said bi-laminar structure is coated in a viscoelastic material along its length and bonded to a rigid base with one of a viscoelastic material and a polymer in order to tune said resonant frequency and mechanical quality factor to a desired value.

6. The acoustic vector sensor of claim 1, further comprising piezoelectric plates comprised of a ceramic material or a single crystal material.

7. The acoustic vector sensor of claim 1, wherein said at least one accelerometer comprises at least one accelerometer per axis.

8. The acoustic vector sensor of claim 1, further comprising a piezoelectric transducer to measure acoustic pressure.

9. A method for measuring an acoustic signal, comprising:
configuring an array of acoustic vector sensors comprised of at least one accelerometer to measure at least one component of acoustic particle acceleration;
operating said at least one accelerometer at a resonant frequency within a measurement band of said acoustic vector sensor; and
generating a voltage using one or more of said acoustic vector sensors representative of said acoustic signal as said acoustic signal propagates past said array.

10. The method of claim 9, wherein said voltage indicates a bearing of said acoustic signal.

11. The method of claim 9, wherein each acoustic vector sensor is positioned in said array such that a principal axis of sensitivity of the accelerometers is perpendicular to an axis of said array.

\* \* \* \* \*